US011875604B1

(12) United States Patent
Abad et al.

(10) Patent No.: US 11,875,604 B1
(45) Date of Patent: Jan. 16, 2024

(54) SYSTEMS AND METHODS FOR DETERMINING HAND POSES IN ARTIFICIAL REALITY ENVIRONMENTS

(71) Applicant: Meta Platforms Technologies, LLC, Menlo Park, CA (US)

(72) Inventors: John-Fred Gilbert Abad, Redwood City, CA (US); Sohail Sayed Shafii, Fremont, CA (US); Andrew Mitchell Welch, Richardson, TX (US); Ryan Daniel Rutherford, Castro Valley, CA (US); Travis Creighton Hoffstetter, San Mateo, CA (US); Paul Nelson, Tracy, CA (US); Oneil Howell, Clayton, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 2 days.

(21) Appl. No.: 17/181,723

(22) Filed: Feb. 22, 2021

(51) Int. Cl.
*G06V 40/20* (2022.01)
*G06T 7/73* (2017.01)
*G06F 3/01* (2006.01)
*G06T 19/00* (2011.01)
*G06V 40/10* (2022.01)

(52) U.S. Cl.
CPC ............ *G06V 40/28* (2022.01); *G06F 3/011* (2013.01); *G06T 7/73* (2017.01); *G06T 19/006* (2013.01); *G06V 40/107* (2022.01)

(58) Field of Classification Search
CPC ...... G06V 40/11; G06V 40/28; G06V 40/107; G06T 7/73; G06T 19/006; G06F 3/011
See application file for complete search history.

(56) References Cited

U.S. PATENT DOCUMENTS

| 2012/0249741 A1* | 10/2012 | Maciocci | G06T 19/006 |
| | | | 348/51 |
| 2020/0005026 A1* | 1/2020 | Andersen | A63F 13/573 |
| 2022/0253808 A1* | 8/2022 | Ferguson | G06F 3/011 |

FOREIGN PATENT DOCUMENTS

JP          5083992 B1 *  11/2012

OTHER PUBLICATIONS

Wikipedia, Normalization, Jan. 2, 2021, https://en.wikipedia.org/w/index.php?title=Normalization_(statistics)&oldid=997823157 (Year: 2021).*

(Continued)

*Primary Examiner* — Benjamin C Lee
*Assistant Examiner* — Nathan P Brittingham
(74) *Attorney, Agent, or Firm* — Baker Botts L.L.P.

(57) ABSTRACT

A method includes a computing system receiving an image of a real-world environment, the image including at least a portion of a hand of a user of an artificial reality device, the hand comprising a palm and a plurality of fingers. The computing system determines a hand pose of the hand using the image, and defines, based on the hand pose, a three-dimensional surface positioned in the palm of the hand. The computing system determines, based on the hand pose, distances between predetermined portions of the plurality of fingers and the three-dimensional surface. The computing system assigns, based on the distances, a pose value for each of the plurality of fingers of the hand and determines, based on the pose values for the plurality of fingers, a grab state of the hand.

20 Claims, 10 Drawing Sheets

(56) References Cited

OTHER PUBLICATIONS

"MephestoKhaan/HandPosing," *Home • MephestoKhaan/HandPosing Wiki • GitHub*, Luca Mefisto edited this page on Dec. 29, 2020, 4 revisions, 3 pages, Jul. 20, 2020.
"MephestoKhaan/HandPosing/Grabbables," https://github.com/MephestoKhaan/HandPosing/wiki/Grabbables, Luca Mefisto edited this page on Dec. 29, 2020, 5 revisions, 3 pages, Jul. 20, 2020.
"MephestoKhaan/HandPosing/Hand Puppeting," https://github.com/MephestoKhaan/HandPosing/wiki/Hand-Puppeting, Luca Mefisto edited this page on Nov. 23, 2020, 3 revisions, 3 pages, Jul. 20, 2020.
"MephestoKhaan/HandPosing/Pose Recording," *Pose Recording • MephestoKhaan/HandPosing Wiki • GitHub*, Luca Mefisto edited this page on Dec. 29, 2020, 8 revisions, 10 pages, Jul. 20, 2020.
"MephestoKhaan/HandPosing/Puppeting Oculus Avatars," *Puppeting Oculus Avatars • MephestoKhaan/Handposing Wiki • GitHub*, Luca Mefisto edited this page on Dec. 29, 2020, 1 revision, 2 pages, Jul. 20, 2020.
"MephestoKhaan/HandPosing/Snapping Behaviours," *Snapping Behaviours • MephestoKhaan/HandPosing Wiki • GitHub*, Luca Mefisto edited this page on Dec. 29, 2020, 12 revisions, 7 pages, Jul. 20, 2020.
"MephestoKhaan/HandPosing/README.md/HandPosing," *GitHub—MephestoKhaan/HandPosing: Pose authoring using handtracking on Quest*, MIT License, 4 pages, Jul. 20, 2020.
"HandPosing, A tool for quickly snapping hands to objects in VR using hand-tracking," *HandPosing: Class List* (mephestokhaan.github.io), Generated by doxygen 1.9.0, 2 pages, Jul. 20, 2020.

\* cited by examiner

SYSTEMS AND METHODS FOR DETERMINING HAND POSES IN ARTIFICIAL REALITY ENVIRONMENTS

TECHNICAL FIELD

This disclosure generally relates to computer graphics and techniques to determine a hand poses.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD 104) connected to a host computer system, a standalone HMD 104, a mobile device or computing system, or any other hardware platform capable of providing artificial reality content to one or more viewers.

SUMMARY OF PARTICULAR EMBODIMENTS

Embodiments disclosed provide a technique to continuously detect and monitor grab states of a hand that can be used by application developers to quickly and efficiently incorporate detection and tracking in their artificial reality applications. Using methods disclosed herein, a computing system associated with an artificial reality system can detect and identify pinch grabs and whole-hand grabs using for example, images of the hands of a user of an artificial reality system. Other embodiments disclosed provide methods for differentiating and distinguishing between a pinch grab and whole-hand grab. When combined, the artificial reality system can detect and differentiate between both types of grabs and allow the user to seamlessly interact with all types of objects in the artificial reality environment.

Embodiments disclosed provide using images of a real-world environment that include at least a portion of a hand of a user to determine a current hand state of the hand based on a current pose value of each of the predetermined portions of the hand, for example a plurality of fingers on the hand. Using this grab state and the received image a pose may be generated and displayed which represents the hand interacting with an object in the artificial reality environment, for example grabbing the object. Further embodiments provide a method for continuously tracking the hand state of one or more hands of the user over a period of time. In particular embodiments the determined hand state may further rely on the hand state of the hand at a preceding time.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
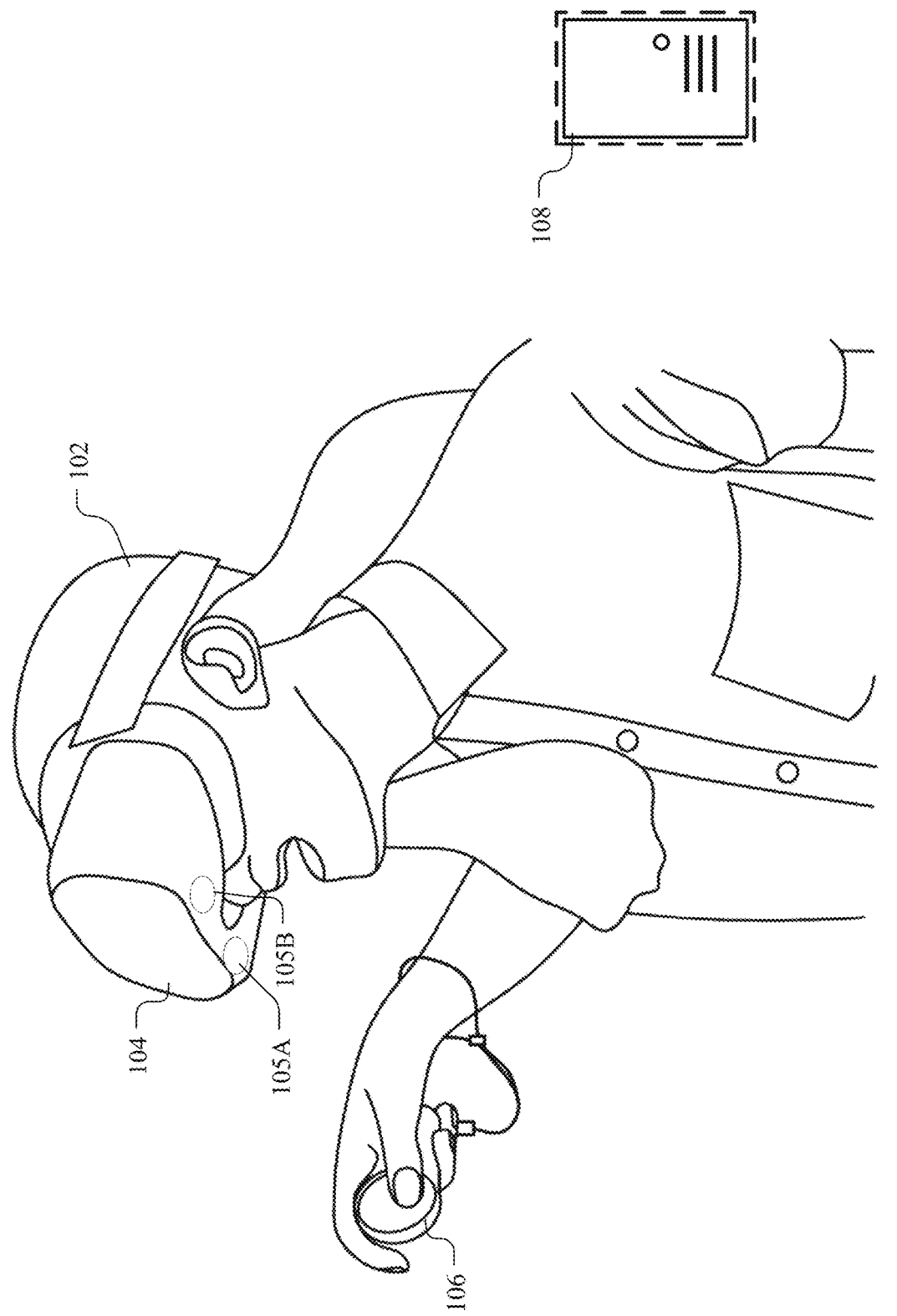
FIG. 1A illustrates an example of an artificial reality system worn by a user.

FIG. 1A illustrates an example of an artificial reality system 100 worn by a user 102. In particular embodiments, the artificial reality system 100 may comprise a head-mounted device ("HMD 104") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience.

Figure 1B:
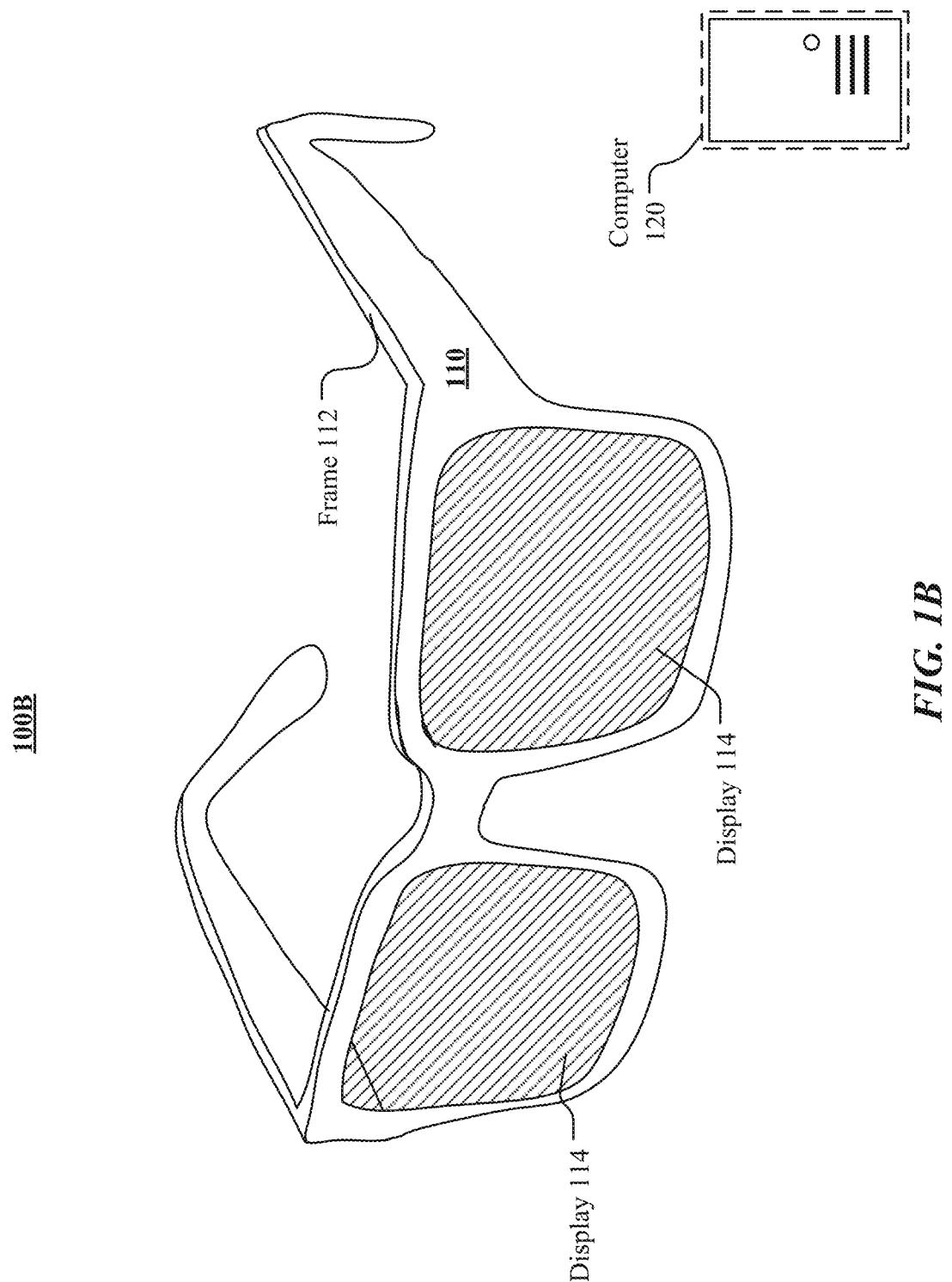
FIG. 1B illustrates an example augmented reality system.

FIG. 1B illustrates an example augmented reality system 100B. The augmented reality system 100B may include an augmented reality head-mounted display (AR HMD) 110 (e.g., glasses) comprising a frame 112, one or more displays 114, and a computing system 120. The displays 114 may be transparent or translucent allowing a user wearing the AR HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. Except as where specified throughout this application, the use of "HMD" can be used to refer to either HMD 104 (which may occlude the user's view of the real environment) or AR HMD 110 (which may permit the user to see the real world and displaying visual artificial reality content to the user at the same time).

The HMD may have external-facing cameras, such as the two forward-facing cameras 105A and 105B shown in FIG. 1A. While only two forward-facing cameras 105A-B are shown, the HMD may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

In particular embodiments, the pose (e.g., position and orientation) of the HMD within the environment may be needed. For example, in order to render an appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD may be equipped with inertial-measurement units ("IMU"). The data generated by the IMU, along with the stereo imagery captured by the external-facing cameras 105A-B, allow the system 100 to compute the pose of the HMD 10 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD or it may be integrated with the HMD. In embodiments where the computer 108 is a separate unit, it may be communicatively coupled to the HMD via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Difficulties exist for developers of artificial reality (e.g., virtual reality, mixed reality, augmented reality) applications that incorporate hand pose tracking techniques, specifically those that seek to track and differentiate between different user hand poses to determine whether a user intends to initiate a grab, or is currently doing so. Designing and incorporating hand pose detection is difficult and often labor-intensive, especially since many artificial reality applications require some level of these techniques. Thus, a need exists to create a solution to detect and monitor hand poses that can be ubiquitously applied across a wide array of artificial reality applications. Ideally, such a solution tracks and detects a wide range of hand poses, including for example, a pinch grab (e.g., grabbing a pencil or other rod-like object), and a whole-hand grab (e.g., grabbing a soccer ball or other large object). Further, there is a need for a method that can be implemented such that they can be easily incorporated into applications, through for example, a software development kit (SDK).

As used herein, the term "pinch" grab as used in accordance with the present disclosure refers to a grab-type that comprises a user moving their thumb and one or more fingers of the remaining fingers (often the index or middle finger) close together, such that the thumb and one or more fingers are touching or nearly touching. For example, a "pinch" grab may be used when a user attempts to pick up or grasp thin or small objects, such as a pencil, a golf ball, or a fork.

As used herein, the term "pinch value" or as used in accordance with the present disclosure refers to a value that indicates a likelihood of a pinch grab or an attempted pinch grab, based on the distance between a predetermined portion (e.g., the fingertips) of two or more fingers on the user's hand. The pinch value may be a normalized confidence value between 0 and 1 (e.g., a value of 0.0 means "no pinch grab" and a value of 1.0 means "full confidence in a pinch grab."). Alternatively, in some embodiments the assigned pinch value may be binary, such that a pinch value of 0 indicates no pinch grab is occurring, and a pinch value of 1 indicates a pinch grab is present.

As used herein, the term "pinch grab strength" as used in accordance with the present disclosure refers to the final state of whether the user's hand intends to perform or is currently performing a pinch grab. The pinch grab strength may be a normalized confidence value between 0 and 1 (e.g., a value of 0.0 means "no pinch grab" and a value of 1.0 means "full confidence in a pinch grab."). Alternatively, in some embodiments the assigned pinch grab strength may be binary, such that a pinch grab strength of 0 indicates no pinch grab is occurring, and a pinch grab strength of 1 indicates a pinch grab is present. The pinch grab strength may be based on the pinch value of one or more portions of the user's hand (e.g., the pinch value assigned to each finger).

As used herein, the term "whole-hand" grab as used in accordance with the present disclosure refers to a grab-type that comprises a user curling a plurality of fingers towards the palm of their hand, such that the fingers are touching or are nearly touching a three-dimensional virtual surface positioned in the palm of the user's hand. For example, a "whole-hand" grab may be used when a user attempts to pick up or grasp large or heavy objects, such as a soccer ball, a sword, or a crate.

As used herein, the term "whole-hand pose value" as used in accordance with the present disclosure refers to a value that indicates a likelihood of a whole-hand grab or an attempted whole-hand grab, based on the pose of at least a portion of the user's hand (e.g., one or more fingers of the user's hand). The whole-hand pose value may be a normalized confidence value between 0 and 1 (e.g., a value of 0.0 means "no whole-hand grab" and a value of 1.0 means "full confidence in a whole-hand grab."). Alternatively, in some embodiments the assigned whole-hand pose value may be binary, such that a whole-hand pose value of 0 indicates no whole-hand grab is occurring, and a whole-hand pose value of 1 indicates a whole-hand grab is present.

As used herein, the term "whole-hand grab strength" as used in accordance with the present disclosure refers to the final state of whether the user's hand intends to perform or is currently performing a whole-hand grab. The whole-hand grab strength may be a normalized confidence value between 0 and 1 (e.g., a value of 0.0 means "no confidence of a whole-hand grab" and a value of 1.0 means "full confidence of a whole-hand grab."). Alternatively, in some embodiments the assigned whole-hand grab strength may be binary, such that a whole-hand grab strength of 0 indicates no whole-hand grab is occurring, and a whole-hand grab strength of 1 indicates a whole-hand grab is present. The whole-hand grab strength may be based on the whole-hand pose value of one or more portions of the user's hand (e.g., the whole-hand pose value assigned to each finger).

Figure 2:
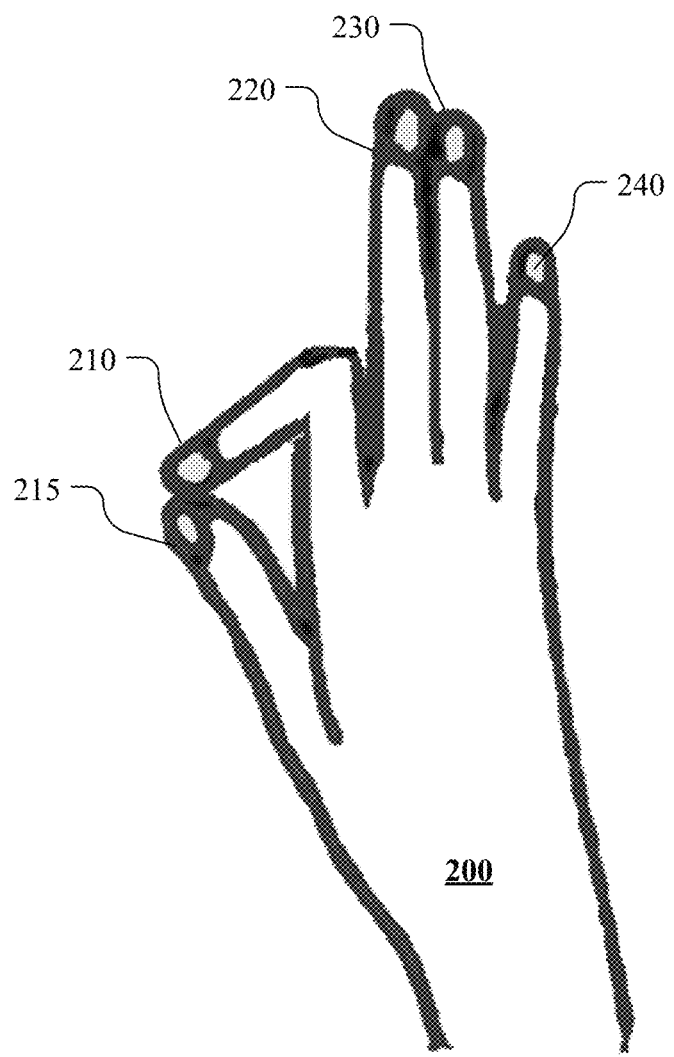
FIG. 2 illustrates an image of a hand that may be assigned a pinch grab strength value associated with a pinch grab.

Existing computer vision techniques provide methods for generating a confidence score that an image of a hand is performing or attempting to perform a pinch grab. For example, FIG. 2 illustrates an image of a hand that may be assigned a pinch grab strength value associated with a pinch grab. Using image data that includes at least a portion of a hand 200 of a user, the computing system may determine a distance between one or more fingers, for example the distance between the index fingertip and the thumb fingertip, and/or the distance between the middle fingertip and the thumb fingertip. Based on these distances, the system may assign a pinch value to one or more portions of the hand, for example to both the index finger and the middle finger. For example as illustrated in FIG. 2 and Table 1, if the distance between the index finger 210 and thumb finger 215 is small such that the two fingers are close together or touching, the pinch value assigned to the index finger may be at or nearly 1.0, whereas if distance between the middle fingertip 220, ring fingertip 230, and pink fingertip 240, respectively, are far apart from thumb fingertip 215, the pinch value assigned to the middle finger, ring finger, and pinky finger may be at or nearly 0.0. In particular embodiments the computing system may assign a pinch value to one, all, or any combination of fingers, including the thumb finger. For example, the computing system may only assign a pinch to the index finger and middle finger, since only these fingers may be used for a typical pinch grab used to obtain small objects, such as a pencil or fork.

TABLE 1

"Pinch" Values

| Finger | Pinch Value |
| --- | --- |
| Index | 1.0 |
| Middle | 0.0 |
| Ring | 0.0 |
| Pinky | 0.0 |

Using the pinch values permits a pinch grab strength of the entire hand to be determined. As previously taught the pinch grab strength may be the maximum of the pinch values assigned to one or more fingers on the hand, for example the maximum of the index and middle fingers. Returning to FIG. 2 and Table 1, if the index finger is assigned a pinch value close to 1.0, and the middle, ring, and pinky fingers are assigned a pinch value close to 0.0, the pinch grab strength of the hand 200 may be equal to maximum value, which in the present example is the index finger pinch value (e.g., 1.0). The pinch grab strength may represent the confidence the hand is performing or attempting to perform a pinch grab.

While the existing pinch grab techniques are useful for predicting the state of the hand when initiating a grab of a thin object, this technique may be less accurate when initiating a grab of a large or heavy object that may require the whole hand since the distance of the index fingertip and/or middle fingertip from the thumb fingertip may be large when initiating a grab of a large object (e.g., the object may be so large that the distance between the thumb and the remaining fingers is large). In many AR/VR environments, users are more likely to interact with these large/heavy objects that require the user's entire hand to grasp the object. For example, a medieval VR application may require the user to pick up heavy objects such as swords and shields that require the user's entire hand. Thus, there exists a need to identify whole-hand grabs by users of artificial reality systems, and moreover a need to differentiate between pinch grabs and whole-hand grabs such that both types of grabs can be differentiated and incorporated into an artificial reality experience.

Embodiments disclosed herein provide a technique to continuously detect and monitor grab states of a hand that can be used by application developers to quickly and efficiently incorporate detection and tracking in their artificial reality applications. Using methods disclosed herein, a computing system associated with an artificial reality system can detect and identify whole-hand grabs using for example, images of the hands of a user of an artificial reality system. Other embodiments disclosed provide methods for differentiating and distinguishing between a pinch grab and whole-hand grab. When combined, the artificial reality system can detect and differentiate between both types of grabs and allow the user to seamlessly interact with all types of objects in the artificial reality environment.

Figure 3A:
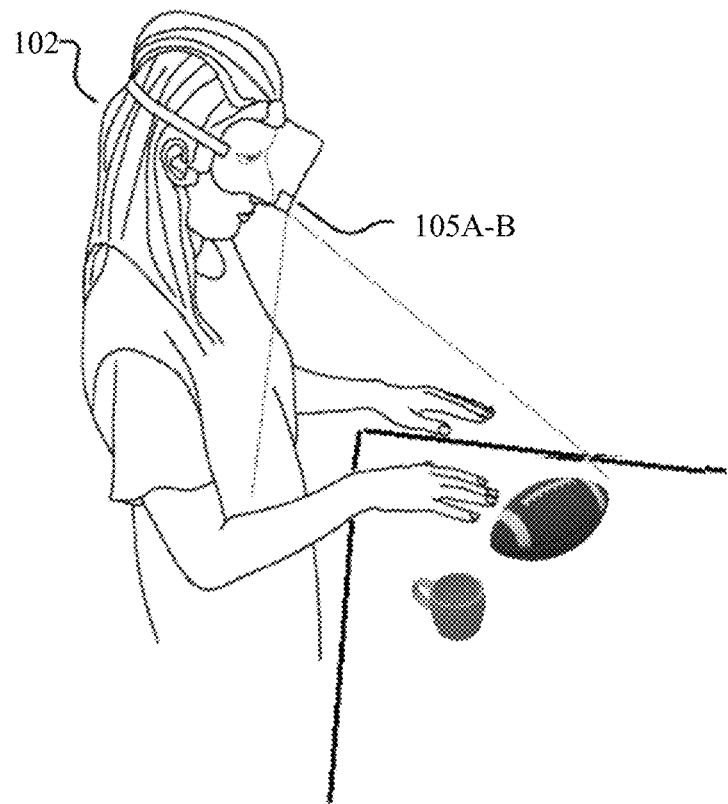
FIG. 3A illustrates a field of view of one or more cameras of a device worn by a user that includes a real-world environment.
Figure 3B:
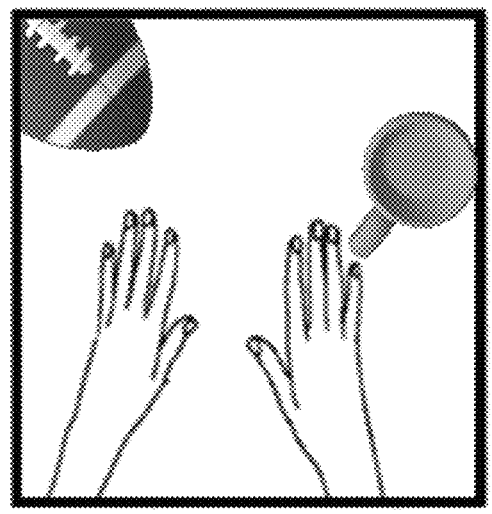
FIG. 3B illustrates a sample image that may be captured by one or more cameras of a device worn by a user of a real-world environment.
Figure 4A:
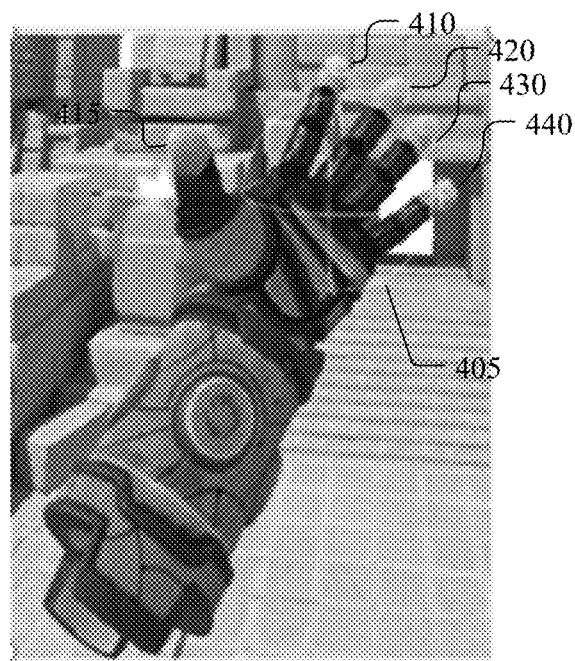
FIGS. 4A-D illustrate an image of a virtual hand from various perspectives that may be assigned a whole-hand grab strength associated with a whole-hand grab.
Figure 4B:
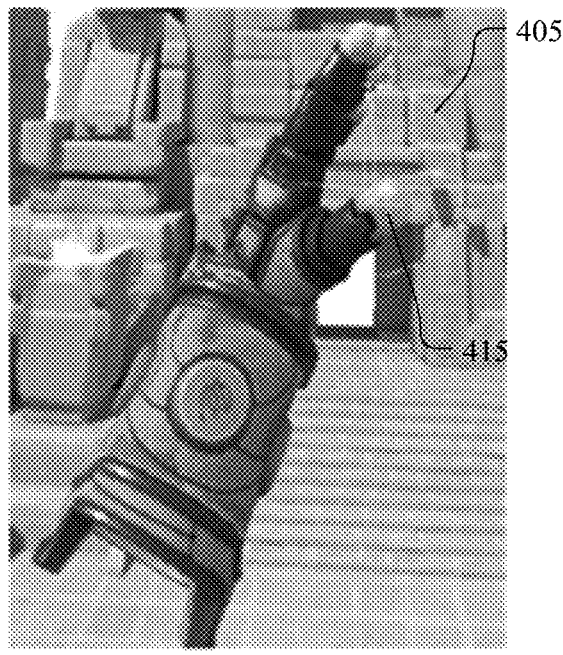
Figure 4C:
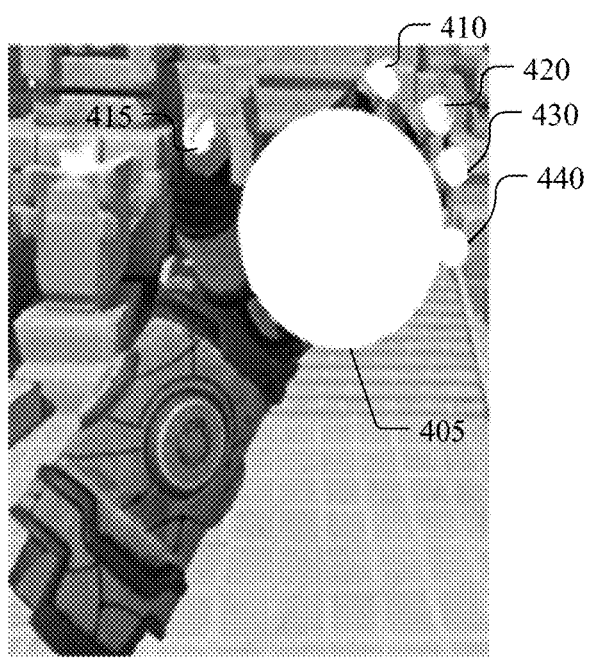
Figure 4D:
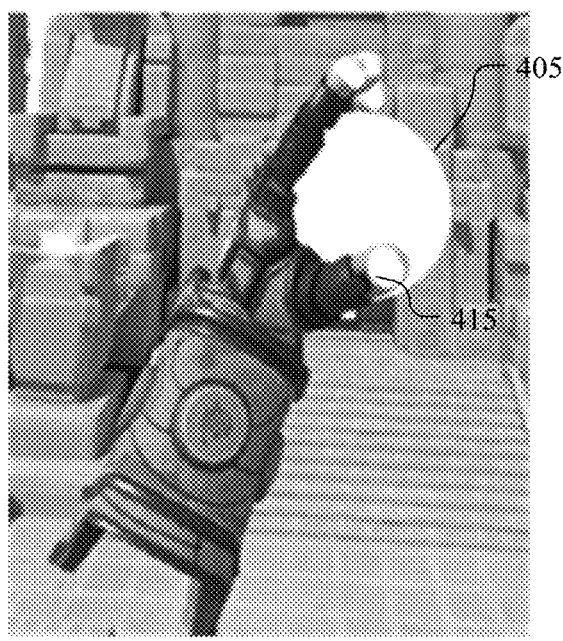

In particular embodiments, a computing system may receive one or more images of a real-world environment. FIG. 3A illustrates a field of view of one or more cameras 105A-B of a device worn by a user 102 that includes a real-world environment. FIG. 3B illustrates a sample image that may be captured by one or more cameras 105A-B of a device worn by a user 102 of a real-world environment. The image may include at least a portion of a hand of user 102 of the artificial reality device, the hand comprising at least a palm and a plurality of fingers. In particular embodiments the computing system may determine a hand pose of one or more hands using the image, or determine the pose of one or more portions of the user's hands (e.g., the palm, one or more fingers, or one or more fingertips) or a relative distance between one or more portions of the user's hands (e.g., distance between two fingers/fingertips, distance between a finger/fingertip and the palm, etc.). In particular embodiments the pose of the hand or the pose of one or more portions of the hand may be based on generating one or more physics capsules or based on generating one or more bones or skeletal structures using the images of the user's hand. In particular embodiments the one or more physics capsules are sized based on the size of the user's joints in the hand. Using these capsules, the computing system may identify the position of a fingertip on a finger based on a known spatial relationship of a physics capsule representing the finger. For example, the computing system can measure the length from a position of the beginning of the capsule to the tip of the capsule (e.g., the fingertip). In particular embodiments the length traversed (e.g., between the beginning and tip of the capsule) is equal to the height of the capsule itself. In other embodiments, the computing system can measure from the center of the capsule (e.g., the center of mass), and traverse half up the direction of the capsule to the tip of the capsule (e.g. the fingertip).

Using this image data and/or one or more of these measurements, the computing system can detect a current state of one or more of the user's hands that are depicted in the image data using the methods disclosed herein. The hand pose may include the pose of one or more portions of the hand, for example the pose of one or more fingers or fingertips on the hand. The hand pose may be used to assign a pinch-value or whole-hand pose value to one or more portions of the hand (e.g., one or more fingers). Particular embodiments provide methods that use these values to determine the grab strength (e.g., a pinch grab strength or whole-hand grab strength) of the hand that may represent the confidence that a hand is performing or attempting to perform different types of grabs, for example a pinch grab or a whole-hand grab.

In some embodiments a whole-hand pose value associated with a whole-hand grab may be assigned to one or more portions of one or more hands in the image. FIGS. 4A-D and FIG. 5A-D illustrate an image of a virtual hand from various perspectives that may be assigned a whole-hand grab strength associated with a whole-hand grab. Using image data that includes at least a portion of a hand of a user, the computing system may determine a hand pose that includes the pose of the portions of the plurality of fingers using the methods described herein. Based on this pose, the computing system may define a three-dimensional surface positioned in the palm of the hand. In particular embodiments this three-dimensional surface 405 may be a sphere. The size (e.g., the radius) of three-dimensional surface 405 may be preset or scaled based on the size of the user's hand, and the computing system may determine the pose of the three-dimensional surface based on a known spatial relationship or offset between the location of the user's wrist, hand, or another body part, such that the pose of the three-dimensional surface may be hand-locked to the pose of the users hand. In certain embodiments the radius of a sphere may be preset to 7.5 centimeters. In other embodiments, the size of the three-dimensional surface may be based on the size of the hand of the user, such that the three-dimensional surface 405 is larger (e.g., larger sphere radius) for a person with a larger hand (e.g., a professional basketball player), and smaller (e.g., smaller sphere radius) for a person with a smaller hand (e.g., a child). Although FIGS. 4A-D and 5A-D depict the concept of the three-dimensional sphere 405 in the palm of the user's hand, it should be appreciated that in particular embodiments the three-dimensional sphere is not generated and displayed in the artificial reality environment and is thus not visible to the user.

In particular embodiments the computing system may determine based on the hand pose, one or more distances between the predetermined portions (e.g., the fingertips) of the plurality of fingers and the three-dimensional surface. Based on these distances, the system may assign a whole-hand pose value to one or more portions of the hand, for example to each of the plurality of fingers of the hand. The whole-hand pose value is strongest (e.g., 1.0) when the predetermined portions of the finger is closest to or inside the surface of the three-dimensional surface, and weakest (0.0) when the predetermined portions of the finger is located at a large distance outside the surface of the three-dimensional surface. For example, if the predetermined portion of the finger is inside the surface of the three-dimensional surface, it may be assigned the maximum whole-hand pose value. As another example, if the same predetermined portion of the finger is close to, but outside the surface of the three-dimensional surface, the computing system may determine a whole-hand pose value based on the distance of the fingertip from the surface (with higher whole-hand pose values indicating closer proximity), using for example linear interpolation. In particular embodiments all whole-hand pose values may be normalized between 0.0 and 1.0, with 1.0 representing the strongest whole-hand pose value (i.e., indicating the hand is performing or attempting to perform a whole-hand grab).

In other embodiments, the computing system may determine the grab strength of each finger by generating small spheres at the fingertip of each finger to assign a whole-hand pose value to one or more portions of the hand. For example, the system may determine the percentage of overlap (normalized between 0.0 and 1.0) between the small sphere representing the fingertip and the three-dimensional surface 405. The whole-hand pose value is strongest (e.g., 1.0) when the small sphere representing the fingertip is completely encompassed within the volume of three-dimensional surface 405, and weakest (0.0) when the small sphere representing the fingertip is located completely outside the three-dimensional surface 405 (e.g., no overlap). In particular embodiments all whole-hand pose values may be normalized between 0.0 and 1.0, with 1.0 representing the strongest whole-hand pose value (i.e., indicating the hand is performing or attempting to perform a whole-hand grab).

Returning to FIG. 4A-D (with particular emphasis on FIG. 4C) and Table 2, if the index finger 410 and middle finger 420 are fully extended outward and away from the three-dimensional surface 405, the whole-hand pose value assigned to the index and middle finger may be at or nearly 0.0, whereas if the ring finger 430 and pinky finger 440 are curled inward and nearer but not located on the three-dimensional surface 405, the ring and pinky fingers may be assigned a larger whole-hand pose value, for example 0.6. In particular embodiments the computing system may assign a whole-hand pose value to one, all, or any combination of fingers, including the thumb finger.

TABLE 2

Whole-Hand Pose Values

| Finger | Whole-Hand Pose Values |
| --- | --- |
| Index | 0.0 |
| Middle | 0.0 |
| Ring | 0.6 |
| Pinky | 0.6 |

Figure 5A:
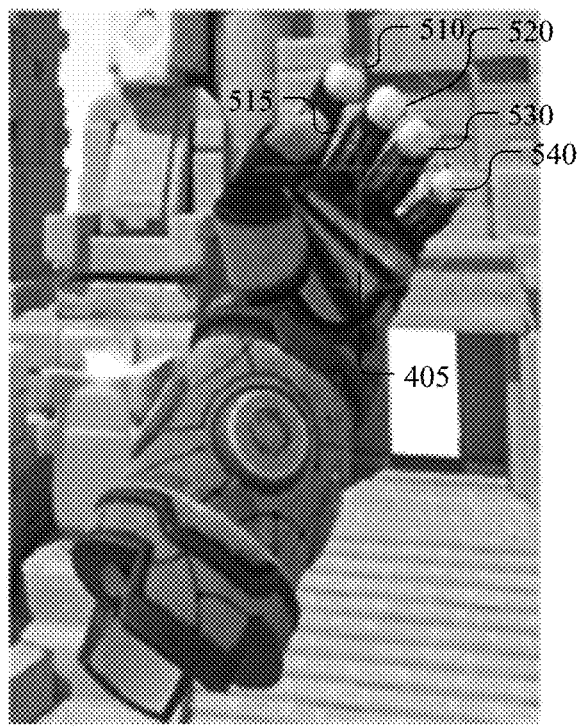
FIGS. 5A-D illustrate an image of a virtual hand from various perspectives that may be assigned a whole-hand grab strength associated with a whole-hand grab.
Figure 5B:
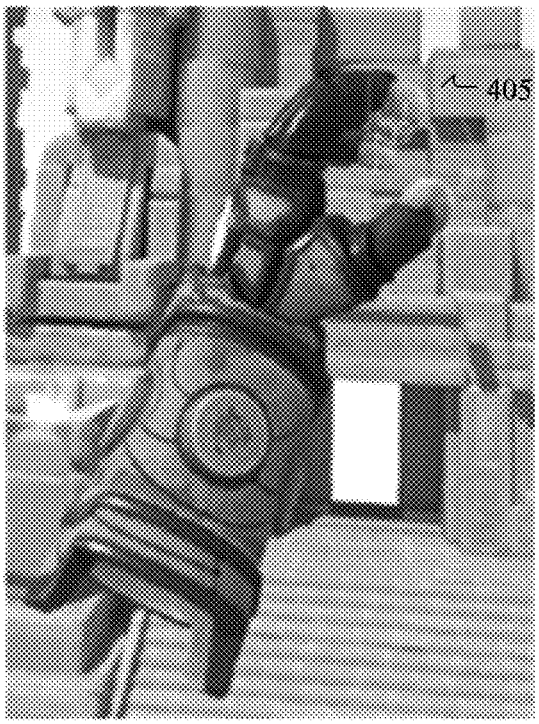
Figure 5C:
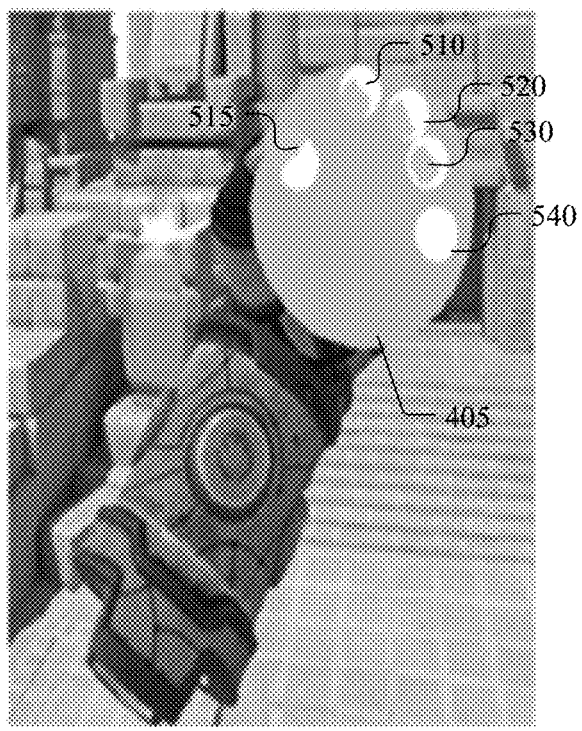
Figure 5D:
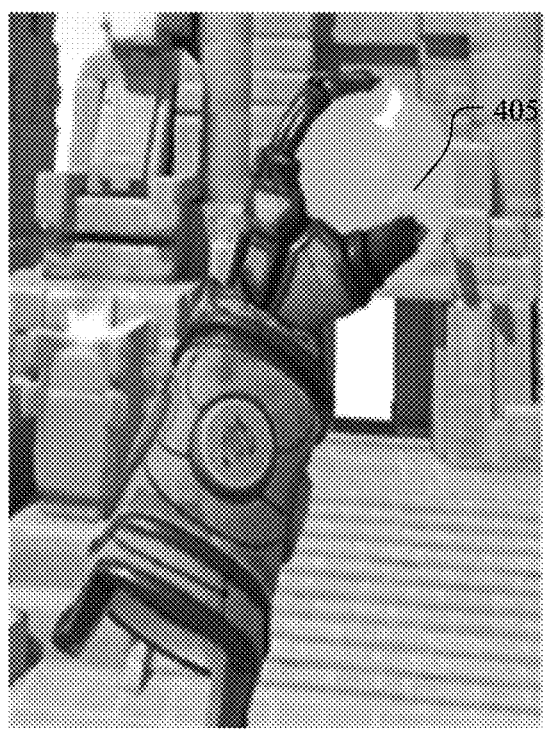

As another example, FIGS. 5A-D and Table 3 depict a virtual hand that is initiating a grab of an object as viewed from various perspectives. For example, as best illustrated in FIGS. 5C and 5D, if the index finger 510, middle finger 520, ring finger 530, and pinky finger 540 are all located on or inside the surface of three-dimensional surface 405, the whole-hand pose value assigned to each of the fingers may be at or nearly 1.0.

TABLE 3

Whole-Hand Pose Values

| Finger | Whole-Hand Pose Values |
| --- | --- |
| Index | 1.0 |
| Middle | 1.0 |
| Ring | 1.0 |
| Pinky | 1.0 |

In particular embodiments the computing system may determine a whole-hand grab strength of the entire hand based on the values to the predetermined portions of the hand (e.g., the fingers). The whole-hand grab strength may represent the confidence the hand is performing or attempting to perform a whole-hand grab. In some embodiments the determined whole-hand grab strength may be the minimum of the whole-hand pose values assigned to one or more fingers on the hand. In the previous example as summarized in Table 2, the hand may be assigned a whole-hand grab strength value equal to the index and middle fingers grab strength value (e.g., 0.0). An advantage of this embodiment is its simplicity, as it does not require the additional resources required to generate pinch values for the hand. However, while this embodiment is useful for predicting the pose of the hand when initiating a grab of large or heavy objects, this technique may be less accurate when initiating a grab of small or thin objects that can be easily grabbed with two or three fingers (e.g., a pencil or fork). For example, the whole-hand grab detection may not detect a grab when the hand is posed such that only one finger is sticking out or not pinching at all, for example if only two fingers are used to initiate a grab of objects and the others are fully extended. As such, this technique is preferable in environments or with objects where a whole-hand grab is required.

In particular embodiments the whole-hand grab strength of the hand may be a function of both the pinch values and whole-hand pose values assigned to one or more portions of the hand. For example, in some embodiments the computing system may determine the maximum of the pinch value and whole-hand pose value for one or more predetermined portions of the hand, such that there is only one value for each portion. The computing system may then determine the minimum of these values for each portion to determine the whole-hand grab strength. Doing so provides the advantage of combining the pinch grab and whole-hand grab techniques to detect both types of grabs. This may be advantageous for artificial reality environments where a user may initiate grabs of both large and small objects, for example a virtual reality gaming application.

To illustrate, as depicted in Table 4, for a given hypothetical hand pose the index finger and middle finger are assigned a pinch value of 1.0, the ring finger is assigned a pinch value of 0.3, and the pinky finger is assigned a pinch value of 0.0. For the same hypothetical hand pose, the index finger is assigned a whole-hand pose value of 1.0, the middle finger is assigned a whole-hand pose value of 0.7, the ring finger is assigned a whole-hand pose value of 0.2, and the pinky finger is assigned a whole-hand pose value of 0.1. As depicted in Table 4, to determine the whole-hand grab strength the computing system may determine the maximum of the pinch value and whole-hand pose value assigned to each of the fingers, and assign this maximum value to each of the fingers. For example as depicted in Table 4 the index, middle, ring, and pinky fingers would be assigned values of 1.0, 1.0, 0.3, and 0.1, respectively. To compute the whole-hand grab strength for the hand, the computing system may compute the minimum of these assigned maximums stored values for all fingers. Thus, as depicted in Table 4, the whole-hand grab strength of the hand is 0.1.

TABLE 4

Pinch Value 8 Whole-Hand Pose Value

| Finger | Pinch Value | Whole-Hand Pose Value | Maximum of Both Values |
| --- | --- | --- | --- |
| Index | 1.0 | 1.0 | 1.0 |
| Middle | 1.0 | 0.7 | 1.0 |
| Ring | 0.3 | 0.2 | 0.3 |
| Pinky | 0.0 | 0.1 | 0.1 |

Although the disclosed examples provide methods for determining a whole-hand grab strength that may require determining a maximum and/or minimum whole-hand pose value among a set of pinch and/or whole-hand pose values (e.g., a maximum pinch and/or whole-hand pose values among a set of pinch and/or whole-hand pose values for all fingers on a hand), it should be appreciated that in particular embodiments the computing system may instead determine a whole-hand grab strength according to known statistical methods, for example and not by way of limitation, by averaging a set of pinch and/or whole-hand pose values, by selecting a median pinch and/or whole-hand pose value among a set of pinch and/or whole-hand pose values, or by selecting a pinch and/or whole-hand pose value that represents a certain standard deviation from the average among a set of pinch and/or whole-hand pose values. Further, in particular embodiments the computing system may receive a set of pinch and/or whole-hand pose values and account for and remove one or more outliers prior to determining a whole-hand grab strength (e.g., if three fingers have a pinch and/or whole-hand pose values of 1.0, and the fourth has a pinch and/or whole-hand pose values of 0.0, the 0.0 pinch and/or whole-hand pose values may be removed as an outlier prior to determining the whole-hand grab strength of the hand).

In particular embodiments the computing system may determine a current grab state of the hand (i.e., whether the hand is performing or attempting to perform a grab) based on the determination the whole-hand grab strength exceeds a predetermined threshold value. Upon this determination the threshold value is exceeded, the computing system may determine a grab state and subsequent pose of the hand. For example, if the whole-hand grab strength exceeds a predetermined threshold (e.g., 0.8) the computing system may determine the hand is currently performing or attempting to perform a whole-hand grab.

In particular embodiments, this threshold value may be assigned by the user or the developer of an application, or it may be automatically assigned based on for example, one or more characteristics of the user (e.g., hand size, weight, age, gender, etc.) or characteristics of the application (e.g., a virtual reality game application may have a higher threshold than an interior design application). In this way, in some embodiments the threshold value may differ on a per-user and/or per-application basis. In some embodiments the threshold value required to transition between each grab state may differ, as described herein.

Several hand states may be identified. For example, an "idle state" may represent a state where the hand is "open" or in a state such that the user is not attempting a grab. In particular embodiments the idle state may be the default state of the hand if no threshold values are exceeded.

A "grab begin state" may represent a state where one or more fingers of the hand are moving closer together or closer to the palm of the hand from an open state, such that a grab is being initiated. In particular embodiments, to determine whether a grab begin state is present, the computing system may determine whether maximum of the pinch grab strength or the whole-hand grab strength exceeds a predetermined grab begin threshold. Thus, because there is an alternative requirement, either a pinch grab or whole-hand grab type by the user may initiate a grab begin state.

A "grab sustain state" may represent a state where one or more fingers of the hand are positioned close together or near the palm of the hand such that the hand is sustaining a grab. In particular embodiments, to determine whether a grab sustain state is present, the computing system may determine whether maximum of the pinch grab strength or the whole-hand grab strength exceeds a predetermined grab sustain threshold. In particular embodiments the grab sustain threshold value may be higher than the grab begin threshold value.

A "grab release state" may represent a state where one or more fingers of the hand are moving farther apart from one another or further from the palm of the hand, as if releasing a grab. In some embodiments, grab release state can be described as in inverse of grab begin state. In particular embodiments, to determine whether a grab begin state is present, the computing system may determine whether maximum of the pinch grab strength and the whole-hand grab strength falls below a predetermined grab release threshold. Thus, because there is an inclusive requirement, both a pinch grab and whole-hand grab type must be released by the user may initiate a grab release state.

Figure 6:
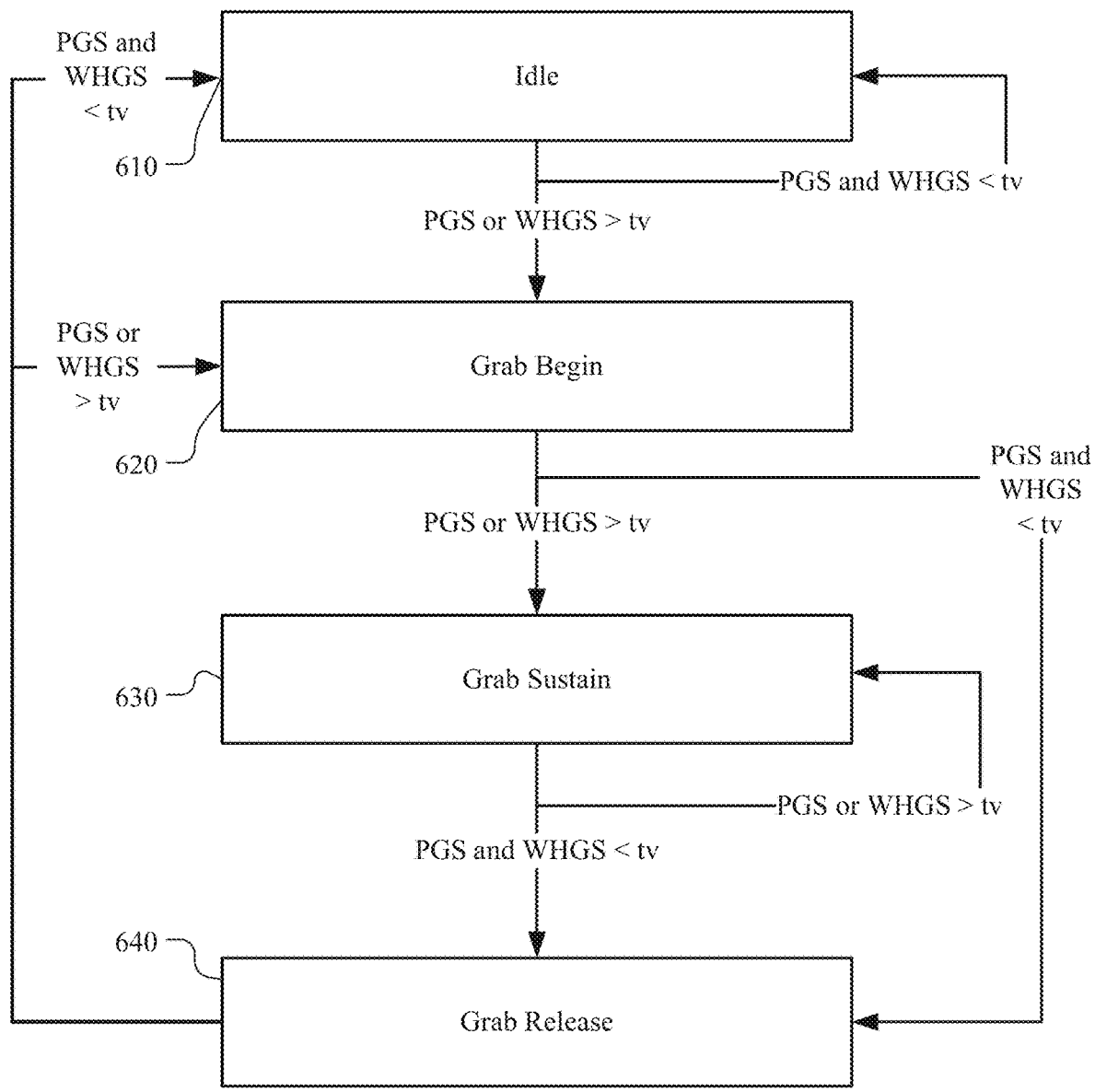
FIG. 6 illustrates a flow for determining the grab state of a hand over a period of time.

Further embodiments provide a method for continuously tracking the hand state of one or more hands of the user over a period of time. In particular embodiments the determined hand state may further rely on the hand state of the hand at a preceding time. FIG. 6 illustrates a flow for determining the grab state of a hand over a period of time. For example, the computing system may receive a sequence of images, or continuously receive image data as the user interacts with the artificial reality environment or an artificial reality application. Using the methods described herein, the computing system may assign a pinch grab strength ("PGS" in FIG. 6) and/or a whole-hand grab strength to a particular hand state or particular image ("WHGS" in FIG. 6) of the hand at a particular time. In particular embodiments the determination of the current grab state of the hand is based whether the assigned whole-hand grab strength exceeds a predetermined threshold value ("tv" in FIG. 6). Upon this determination the threshold value is exceeded, the computing system may determine a grab state and subsequent pose of the hand. In particular embodiments the grab states illustrated in FIG. 6 and as described below may be opaque to the user. Although the threshold value between each state is labeled as "tv" in FIG. 6, it should be understood and appreciated that in some embodiments the threshold value required to transition between each grab state may differ. For example, a grab strength value that exceeds a threshold value of 0.75 may be required to transition from idle grab 610 to grab begin state 620, whereas a grab strength value below a threshold value of 0.25 may be required to transition from grab sustain state 630 to grab release state 640.

In particular embodiments the computing system may receive an image of at least a portion of the hand at a first time and determine based on the grab strength the hand is in idle state 610 at the first time, based on a determination the pinch grab strength and whole-hand grab strength do not exceed a threshold value. The computing system may receive a second or subsequent image of at least a portion of the hand at a second time, and determine a pinch grab strength and whole-hand grab strength corresponding to the second time. If the computing system determines the pinch grab strength or whole-hand grab strength exceeds the threshold value, the hand grab state may transition from idle state 610 to grab begin state 620. Alternatively, if the pinch grab strength and whole-hand grab strength of the hand remains below the threshold value, the hand state may remain in idle state 610.

While the hand is in grab begin state 620, the computing system may receive an image of at least a portion of the hand at a subsequent time, and if the system determines that a corresponding pinch grab strength or whole-hand grab strength continues to exceed the threshold value, the grab state may transition from grab begin state 620 to grab sustain state 630. Alternatively, if while in grab begin state 620, the pinch grab strength and whole-hand grab strength of the hand drops below the threshold value at a subsequent time, the hand state may transition to grab release state 640. In some embodiments, the threshold value for transitioning to grab begin state 620 may differ from the threshold value required to transition to grab release state 640. For example, a grab strength value of at least 0.75 may be the threshold value required to transition to grab begin state 620, whereas a grab strength value at or below 0.25 may be the threshold value required to transition to grab release state 640. In some embodiments, if the threshold values for transitioning between two or more states are too close together, the hand state and corresponding state will continuously bounce back and forth between various states. Thus, these differing threshold values between states may enforce proper hysteresis.

While the hand is in grab sustain state 630, if the computing system determines the pinch grab strength or whole-hand grab strength continues to exceed the threshold value, the hand may remain in grab sustain state 630. Alternatively, if while in grab sustain state 630, the pinch grab strength and whole-hand grab strength of the hand drops below the threshold value, the hand may transition to grab release state 640.

While the hand is in grab release state 640, if the computing system determines the pinch grab strength and whole-hand grab strength continues to stay below the threshold value, the hand may transition to idle state 610. Alternatively, if while in grab release state 640, the pinch grab strength or whole-hand grab strength of the hand exceeds the threshold value, the hand may transition to grab begin state 620.

In particular embodiments the computing system may maintain the current grab state if the subsequent image does not contain a portion of the user's hand, or if the hand is occluded. For example, if the hand is determined to be in a grab sustain state based on an image captured at a first time, but the hand is not present in the image at the second time, the hand may remain in the grab sustain state at the second time. This may be useful for example if the user is attempting to grab and throw a virtual objects, as the user's hand may move outside the field of view of the cameras when the user reaches behind their head to throw the object. For example, as the user throws a baseball, a portion of the baseball and user's hand may be occluded or move outside the field of view from the one or more cameras as the user pulls the ball behind their head to wind up in a natural throwing motion. In this example, the computing system may determine the hand is in a grab sustain state prior to the hand moving outside the field of view. As a result, the computing system may determine the hand remains in a grab sustain state at a second time when the hand remains outside the field of view of the one or more cameras.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for tracking hand state transitions of a hand including the particular steps of the method of FIG. 6, this disclosure contemplates any suitable method for tracking hand state transitions of a hand including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments the computing system may generate a display pose of the hand to display to the user based on the current grab state of the hand. For example, upon determining a grab state has been initiated, the computing system may utilize the received image to determine the user is interacting with a particular object, for example grabbing a coffee mug. In particular embodiments the computing system may determine, based on the proximity of the palm or fingertips of the hand to the object, the particular object the user is interacting with, using for example, computer vision techniques or machine learning models. Based on the determined object, the computing system may access a display pose library or other collection of display poses, which may comprise a collection of fixed, plausible display poses of a hand interacting with or grasping different objects. A display pose may represent an image or sequence of images that represents the state or appearance of the hand when it is grabbing or interacting with the particular object. As an example, the appearance of the hand may differ when holding a pencil when compared to holding a golf ball, even though both may employ a pinch-style grab. The computing system may then display a corresponding display pose from the display pose library that represents the user interacting with the object to provide a more immersive and realistic artificial reality experience.

Figure 7:
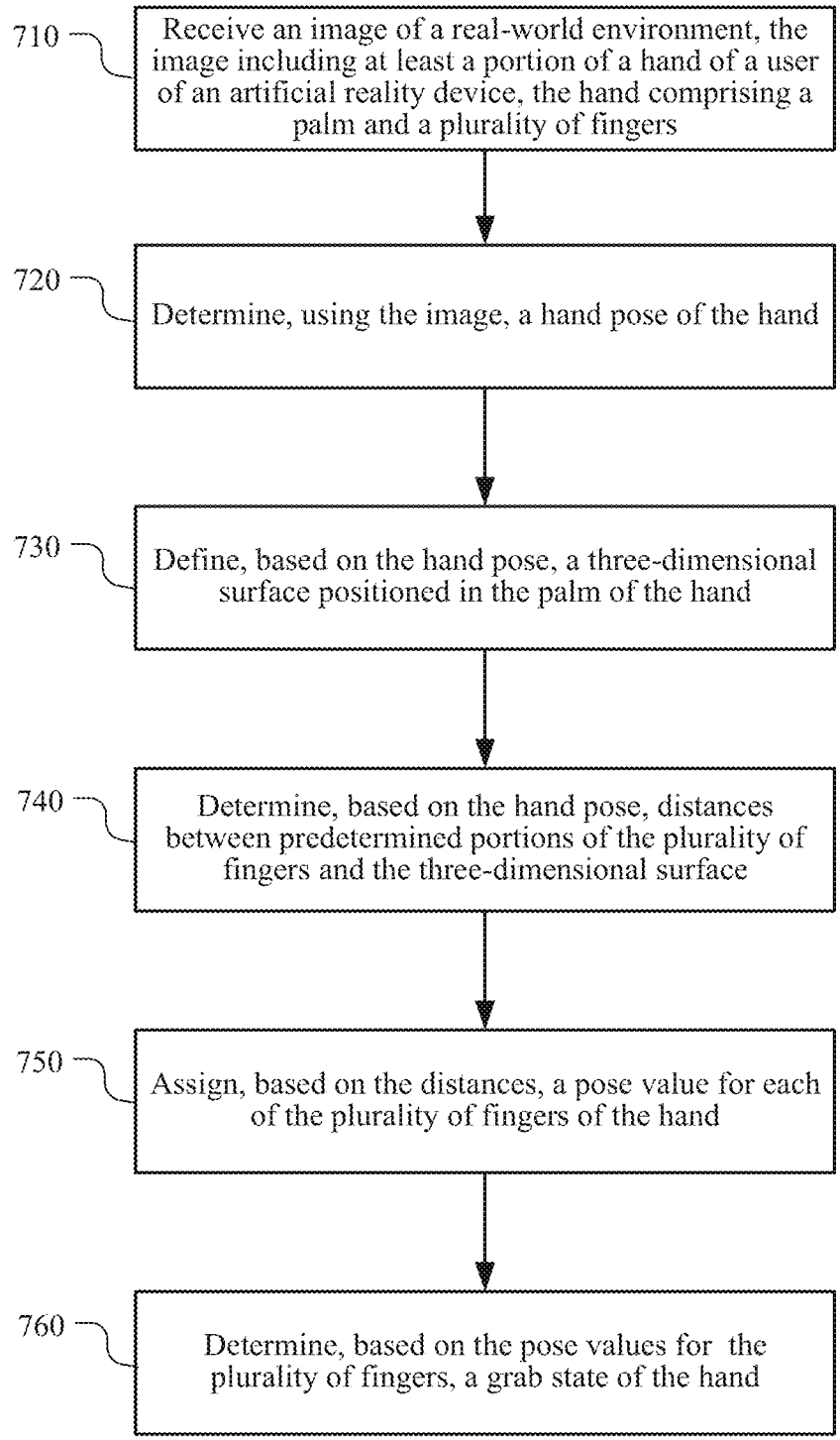
FIG. 7 illustrates an example method for determining a grab state of a hand.

FIG. 7 illustrates an example method 700 for determining a grab state of a hand. The method may begin at step 710, where a computing system receives an image of a real-world environment, the image including at least a portion of a hand of a user of an artificial reality device, the hand comprising a palm and a plurality of fingers. The image may be captured by one or more cameras of a device worn by a user of a real-world environment.

At step 720, the computing system determines, using the image, a hand pose of the hand. The computing system may determine the pose of one or more portions of the user's hands (e.g., the palm, one or more fingers, or one or more fingertips) or a relative distance between one or more portions of the user's hands (e.g., distance between two fingers/fingertips, distance between a finger/fingertip and the palm, etc.).

At step 730, the computing system defines, based on the hand pose, a three-dimensional surface positioned in the palm of the hand. In particular embodiments this three-dimensional surface may be a sphere. The radius of the three-dimensional surface may be preset or scaled based on the size of the user's hand, and the computing system may determine the pose of the three-dimensional surface based on a known spatial relationship or offset between the location of the user's wrist, hand, or another body part, such that the pose of the three-dimensional surface may be hand-locked to the pose of the users hand.

At step 740, the computing system determines, based on the hand pose, distances between predetermined portions of the plurality of fingers and the three-dimensional surface. At step 750, the computing system assigns, based on the distances, a pose value for each of the plurality of fingers of the hand. The hand pose may be used to assign a pose value to one or more portions of the hand (e.g., one or more fingers). The pose value is strongest (e.g., 1.0) when the predetermined portions of the finger is closest to or inside the surface of the three-dimensional surface, and weakest (0.0) when the predetermined portions of the finger is located at a large distance outside the surface of the three-dimensional surface. In particular embodiments all pose values may be normalized between 0.0 and 1.0, with 1.0 representing the strongest pose value.

At step 760, the computing system determines, based on the pose values for the plurality of fingers, a grab state of the hand. The computing system may determine a current grab state of the hand based on the grab strength of the hand. The grab strength may be based on the assigned pose values. The grab strength may represent the confidence the hand is performing or attempting to perform a grab.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for determining a grab state of a hand including the particular steps of the method of FIG. 7, this disclosure contemplates any suitable method for determining a grab state of a hand including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
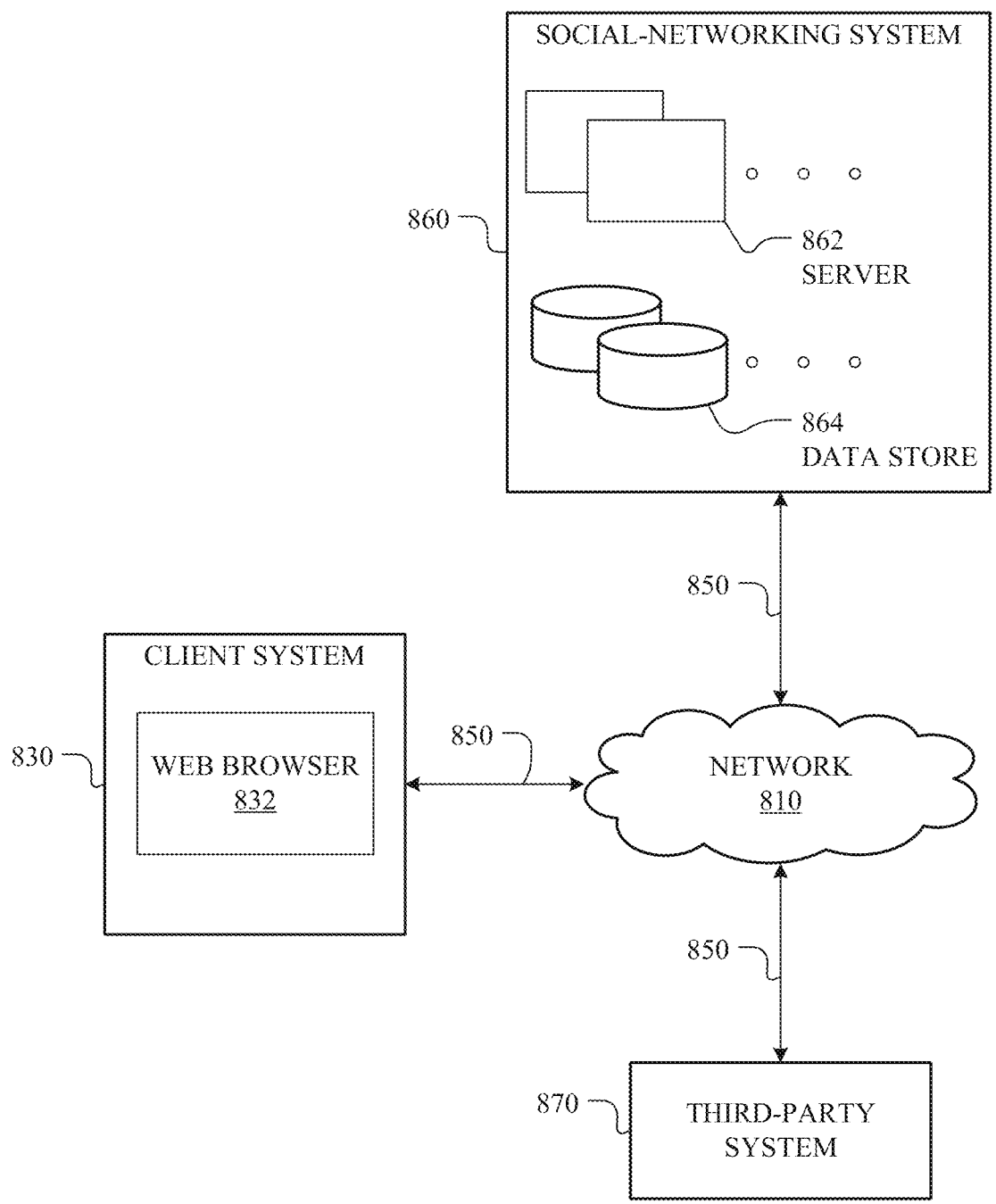
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
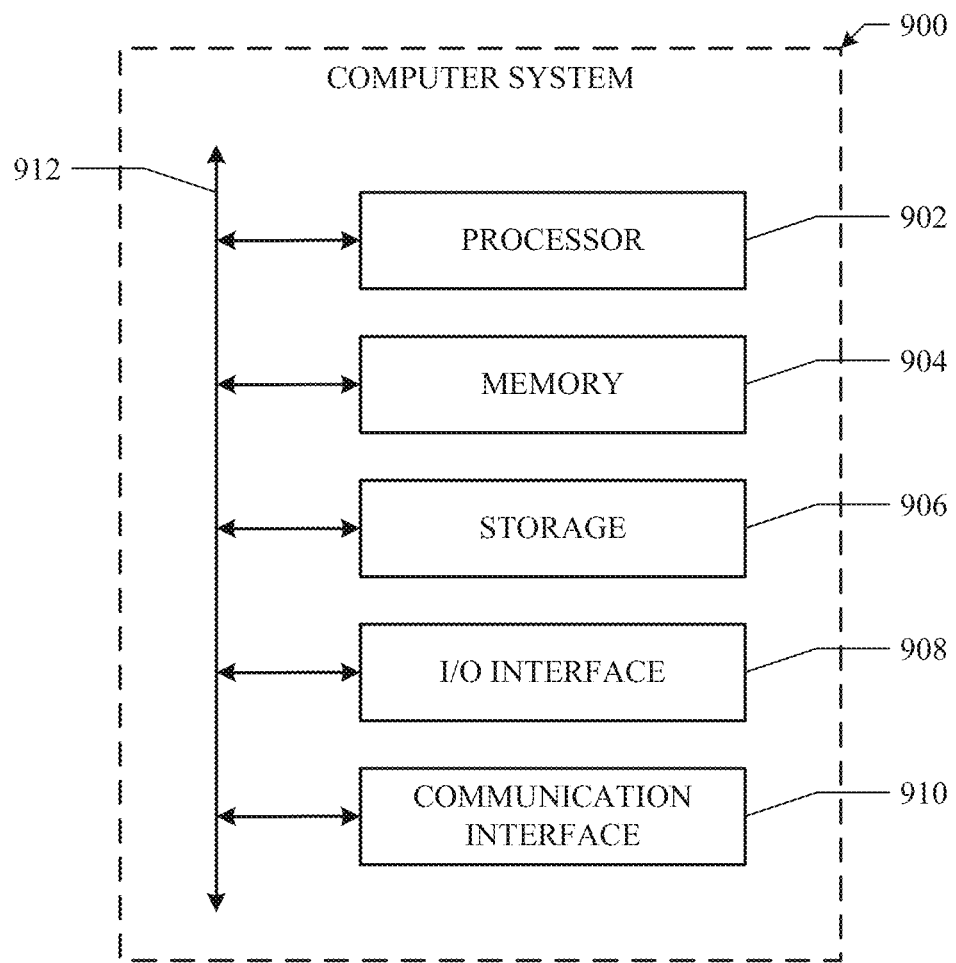
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    receiving an image of a real-world environment, the image including at least a portion of a hand of a user of an artificial reality device, the hand comprising a palm and a plurality of fingers;
    determining, using the image, a hand pose of the hand while the hand is interacting with a virtual object displayed by the artificial reality device;
    determining a grab state indicating whether the hand of the user is grabbing the virtual object, wherein the grab state is determined by:
        defining, based on the hand pose, a three-dimensional surface positioned in the palm of the hand, wherein the three-dimensional surface is (a) different than the virtual object the user is interacting with, (b) invisible to the user, and (c) is configured for determining the grab state of the hand;
        determining distances between predetermined portions of the plurality of fingers and the three-dimensional surface; and
        assigning, based on the distances, a pose value for each of the plurality of fingers of the hand, wherein the grab state is determined based on the pose value;
    accessing, based on the virtual object and the grab state, one or more display poses representing an appearance of the hand interacting with the virtual object; and
    displaying the one or more display poses to the user of the artificial reality device.

2. The method of claim 1, wherein the pose value is a normalized value between 0 and 1.

3. The method of claim 1, wherein determining distances between predetermined portions of the plurality of fingers and the three-dimensional surface comprises:
    generating, for each of the plurality of fingers, a sphere located at a tip of each finger; and
    measuring, for each of the spheres, an overlap of a volume of the sphere and a volume of the three dimensional surface.

4. The method of claim 1, wherein the three-dimensional surface is a sphere with a preset radius.

5. The method of claim 4, wherein the preset radius is determined based on a size of the hand of the user.

6. The method of claim 1, further comprising determining, based on the pose values for the plurality of fingers, a grab strength of the hand, wherein the determined grab state of the hand is further based on the grab strength of the hand.

7. The method of claim 1, wherein the received image includes at least a portion of a wrist of the user, wherein the three-dimensional surface is positioned in the palm of the hand of the user based on an offset from a location of the wrist.

8. The method of claim 1, wherein the received image is captured by one or more cameras connected to the artificial reality device.

9. The method of claim 1, wherein determining the grab state of the hand further comprises:
    determining that a predetermined portion of a first finger of the plurality of fingers is located within the three-dimensional surface;
    assigning a first pose value to the first finger based on the determination that the predetermined portion of the first finger is located within the three-dimensional surface;
    determining that a predetermined portion of a second finger of the plurality of fingers is located outside the three-dimensional surface;
    assigning a second pose value to the second finger based on the determination that the predetermined portion of the second finger is located outside the three-dimensional surface; and
    determining, based on the first and second pose values, the grab state of the hand.

10. One or more computer-readable non-transitory storage media embodying software that is operable when executed to:
    receive an image of a real-world environment, the image including at least a portion of a hand of a user of an artificial reality device, the hand comprising a palm and a plurality of fingers;
    determine, using the image, a hand pose of the hand while the hand is interacting with a virtual object displayed by the artificial reality device;
    determine a grab state indicating whether the hand of the user is grabbing the virtual object, wherein the grab state is determined by:
        define, based on the hand pose, a three-dimensional surface positioned in the palm of the hand, wherein the three-dimensional surface is (a) different than the virtual object the user is interacting with, (b) invisible to the user, and (c) is configured for determining the grab state of the hand;
        determine distances between predetermined portions of the plurality of fingers and the three-dimensional surface; and
        assign, based on the distances, a pose value for each of the plurality of fingers of the hand, wherein the grab state is determined based on the pose value;
    access, based on the virtual object and the grab state, one or more display poses representing an appearance of the hand interacting with the virtual object; and
    display the one or more display poses to the user of the artificial reality device.

11. The media of claim 10, wherein the pose value is a normalized value between 0 and 1.

12. The media of claim 10, wherein the determination of the distances between predetermined portions of the plurality of fingers and the three-dimensional surface comprises:
generating, for each of the plurality of fingers, a sphere located at a tip of each finger; and
measuring, for each of the spheres, an overlap of a volume of the sphere and a volume of the three dimensional surface.

13. The media of claim 10, wherein the three-dimensional surface is a sphere with a preset radius.

14. The media of claim 13, wherein the preset radius is determined based on a size of the hand of the user.

15. The media of claim 10, further comprising determining, based on the pose values for the plurality of fingers, a grab strength of the hand, wherein the determined grab state of the hand is further based on the grab strength of the hand.

16. The media of claim 10, wherein the received image includes at least a portion of a wrist of the user, wherein the three-dimensional surface is positioned in the palm of the hand of the user based on an offset from the wrist.

17. A system comprising:
one or more processors; and
one or more computer-readable non-transitory storage media coupled to one or more of the processors and comprising instructions operable when executed by one or more of the processors to cause the system to:
receive an image of a real-world environment, the image including at least a portion of a hand of a user of an artificial reality device, the hand comprising a palm and a plurality of fingers;
determine, using the image, a hand pose of the hand while the hand is interacting with a virtual object displayed by the artificial reality device;
determine a grab state indicating whether the hand of the user is grabbing the virtual object, wherein the grab state is determined by:
define, based on the hand pose, a three-dimensional surface positioned in the palm of the hand, wherein the three-dimensional surface is (a) different than the virtual object the user is interacting with, (b) invisible to the user, and (c) is configured for determining the grab state of the hand;
determine distances between predetermined portions of the plurality of fingers and the three-dimensional surface; and
assign, based on the distances, a pose value for each of the plurality of fingers of the hand, wherein the grab state is determined based on the pose value;
access, based on the virtual object and the grab state, one or more display poses representing an appearance of the hand interacting with the virtual object; and
display the one or more display poses to the user of the artificial reality device.

18. The system of claim 17, wherein the pose value is a normalized value between 0 and 1.

19. The system of claim 17, wherein the determination of the distances between predetermined portions of the plurality of fingers and the three-dimensional surface comprises:
generating, for each of the plurality of fingers, a sphere located at a tip of each finger; and
measuring, for each of the spheres, an overlap of a volume of the sphere and a volume of the three dimensional surface.

20. The system of claim 17, wherein the three-dimensional surface is a sphere with a preset radius.

* * * * *